United States Patent
Shin

(10) Patent No.: US 11,600,458 B2
(45) Date of Patent: Mar. 7, 2023

(54) HAPTIC GENERATOR AND DRIVING METHOD THEREOF

(71) Applicant: Seong Ho Shin, Gyeonggi-do (KR)

(72) Inventor: Seong Ho Shin, Gyeonggi-do (KR)

( * ) Notice: Subject to any disclaimer, the term of this patent is extended or adjusted under 35 U.S.C. 154(b) by 64 days.

(21) Appl. No.: 17/159,004

(22) Filed: Jan. 26, 2021

(65) Prior Publication Data

US 2022/0199340 A1 Jun. 23, 2022

(30) Foreign Application Priority Data

Dec. 21, 2020 (KR) .................. 10-2020-0179987

(51) Int. Cl.
| | |
|---|---|
| *H01H 13/85* | (2006.01) |
| *G06F 3/16* | (2006.01) |
| *G06F 3/01* | (2006.01) |
| *G08B 6/00* | (2006.01) |
| *H01H 3/00* | (2006.01) |

(52) U.S. Cl.
CPC .......... *H01H 13/85* (2013.01); *G06F 3/162* (2013.01); *G06F 3/016* (2013.01); *G08B 6/00* (2013.01); *H01H 2003/008* (2013.01)

(58) Field of Classification Search
None
See application file for complete search history.

(56) References Cited

U.S. PATENT DOCUMENTS

| | | | | |
|---|---|---|---|---|
| 2001/0026264 A1* | 10/2001 | Rosenberg | .......... | G06F 3/03543 345/156 |
| 2002/0033795 A1* | 3/2002 | Shahoian | ............ | G06F 3/03547 345/156 |
| 2003/0067440 A1* | 4/2003 | Rank | ....................... | G06F 3/016 345/156 |
| 2003/0068053 A1* | 4/2003 | Chu | ..................... | G10H 1/0008 381/118 |
| 2007/0279401 A1* | 12/2007 | Ramstein | ................ | G06F 3/016 345/184 |
| 2008/0062143 A1* | 3/2008 | Shahoian | ................ | G06F 1/169 345/173 |
| 2009/0002315 A1* | 1/2009 | Chu | .................... | G06F 3/03543 345/156 |

FOREIGN PATENT DOCUMENTS

CN 110658919 A * 1/2020 ............ B25J 13/025

* cited by examiner

*Primary Examiner* — Fred Tzeng
(74) *Attorney, Agent, or Firm* — Grossman, Tucker, Perreault & Pfleger, PLLC

(57) ABSTRACT

A haptic generator in accordance with an embodiment of the present disclosure may include a driving signal generator and a haptic device. The driving signal generator may be configured to receive a sound signal and generate a driving signal including an impact driving signal and an inertia driving signal. The haptic device may be configured to generate impact vibrations pursuant to the impact driving signal and generate rotational inertia vibrations pursuant to the inertia driving signal, the rotational inertia vibrations being different from the impact vibrations. The impact driving signal and the inertia driving signal may be generated based on different properties of the sound signal.

13 Claims, 13 Drawing Sheets

HAPTIC GENERATOR AND DRIVING METHOD THEREOF

CROSS-REFERENCE TO RELATED APPLICATIONS

This application claims the benefit of Korean Patent Application No. 10-2020-0179987, filed with the Korean Intellectual Property Office on Dec. 21, 2020, the disclosure of which is incorporated herein by reference in its entirety.

BACKGROUND

1. Technical Field

The present disclosure relates to a haptic generator and a driving method thereof, more specifically to a haptic generator for generating rotational inertia vibrations and impact vibrations and a method of driving said haptic generator.

2. Description of the Related Art

Devices for generating vibrations have been conventionally embedded in mobile phones to alert the users thereof of an incoming call or message by way of vibrations instead of ring tones or in gaming controllers to provide the users with the sense of reality and enhanced enjoyment. Moreover, the recent technological advancement has allowed the mobile phones to be used not only for mere communication but also for playing back and exchanging multimedia files, accessing the Internet and playing games, the gaming consoles to be used not only for playing games but also for accessing the Internet and playing back video, and the video players to be used not only for playing back music and video but also for accessing the Internet and playing games. Accordingly, adopted mostly with compact vibration motors, the vibrating devices are used in increasingly broader applications. In such motors, vibrations are usually adjusted by controlling the voltage to change the number of revolutions of the motors and thereby change the intensity of the vibrations.

SUMMARY

A haptic generator in accordance with an embodiment of the present disclosure may include a driving signal generator and a haptic device.

The driving signal generator may be configured to receive a sound signal and generate a driving signal including an impact driving signal and an inertia driving signal.

The haptic device may be configured to output a haptic effect based on the driving signal.

The haptic device may include a stator unit and a rotor unit.

The stator unit may include a stopper. The rotor unit may be configured to rotate about the stator unit, may include a protrusion, and may be configured to rotationally reciprocate within a range of 360 degrees.

The haptic device may be configured to generate impact vibrations pursuant to the impact driving signal and rotational inertia vibrations pursuant to the inertia driving signal, the rotational inertia vibrations being different from the impact vibrations.

The impact driving signal and the inertia driving signal may be generated based on properties of the sound signal that are different from each other.

The impact vibrations may be generated by a collision of the stopper and the protrusion. The rotational inertia vibrations may be generated by forcing the protrusion to stop rotating before colliding with the stopper or by reversing the rotation of the protrusion.

The impact driving signal may have a frequency that is relatively lower than a frequency of the inertia driving signal, and the impact driving signal may have a duty ratio that is relatively greater than a duty ratio of the inertia driving signal.

The properties of the sound signal may include frequency, magnitude, envelope, roughness, loudness, and sharpness.

The impact driving signal may be generated based on a low-frequency signal of the sound signal, and the inertia driving signal may be generated based on a high-frequency signal of the sound signal.

The driving signal generator may include a sampling unit, a frequency division unit, an energy measuring unit, and an output unit. The sampling unit may be configured to receive the sound signal and sample the received sound signal in a particular time unit to output a sampled signal. The frequency division unit may be configured to receive the sampled signal and divide the sampled signal into a plurality of frequency bands to generate a frequency signal. The energy measuring unit may be configured to receive the frequency signal and generate an energy signal based on cognitive properties of the frequency signal. The output unit may be configured to generate the driving signal based on the frequency signal and the energy signal.

The cognitive properties may include loudness and roughness.

The frequency division unit may be configured to divide a high-frequency signal of the sampled signal into a plurality of sub high-frequency signals. The output unit may be configured to set frequencies of the inertia driving signals corresponding to the sub high-frequency signals to be different from one another.

The output unit may be configured to convert the frequency signal to the driving signal if energy of the frequency signal is greater than a predetermined threshold based on the energy signal and not to convert the frequency signal to the driving signal if energy of the frequency signal is smaller than the predetermined threshold.

The output unit may be configured to output the driving signal during a second period corresponding to a first period of the sampled signal. The output unit may be configured to determine a priority of the driving signal to be included in the second period, based on the magnitude of the energy of the frequency signal.

A driving method of a haptic generator in accordance with an embodiment of the present disclosure may include: receiving a sound signal; analyzing various properties of the sound signal; and generating an impact driving signal and an inertia driving signal based on a plurality of different properties of the sound signal. A haptic device may generate impact vibrations caused by a collision of the stopper and the protrusion pursuant to the impact driving signal and may generate rotational inertia vibrations by forcing the protrusion to stop rotating before colliding with the stopper or by reversing the rotation of the protrusion pursuant to the inertia driving signal.

The properties of the sound signal may include frequency, magnitude, envelope, roughness, loudness, and sharpness.

The impact driving signal may be generated based on a low-frequency signal of the sound signal, and the inertia driving signal may be generated based on a high-frequency signal of the sound signal.

The present disclosure provides a haptic feedback with a greater variety and a more vivid sense of reality by generating impact vibrations and rotational inertia vibrations based on various properties of sound signals and transferring these generated vibrations to users.

DETAILED DESCRIPTION

Figure 1:
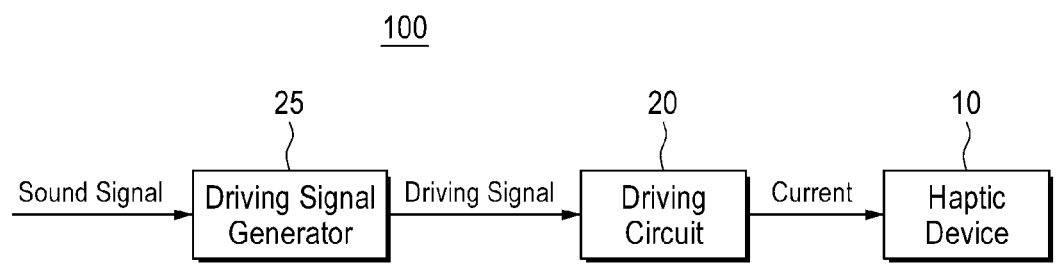
FIG. 1 is a block diagram illustrating a haptic generator in accordance with an embodiment of the present disclosure.

All of the embodiments described below are set forth for illustrative purposes as aids for better understanding the present disclosure and may be practiced in various forms different from the embodiments described herein. Also, in describing the present disclosure, detailed explanations of relevant functions or components that are publicly known are omitted, if it is deemed that such detailed explanations may unnecessarily obscure the essence of the present disclosure.

The accompanying drawings, provided to aid the understanding of the present disclosure, are not necessarily to scale but rather have certain components illustrated in an exaggerated form. In assigning reference numerals to the components, the same numerals are assigned to the same components, as much as possible, even when the components are shown in different drawings.

Terms such as first, second, A, B, (a), (b), etc. may be used herein to describe the embodiments of the present disclosure. It shall be appreciated that such terms are used merely to distinguish one component from another and do by no means limit the nature, sequence, order, etc., of the corresponding component. When a component is described as being, for example, "connected," "coupled," or "joined" to another component, the component may be connected, coupled, or joined directly to the other component, but it shall be appreciated that another component may be "connected," "coupled," or "joined" between the component and the other component.

Therefore, the embodiments described in this specification and the configurations illustrated in the drawings represent the most preferred embodiments of the present disclosure, not the entire technical idea of the present disclosure, and as such, it shall be appreciated that there may be various permutation to the described embodiments of the present disclosure.

Any terms or words used in the present specification and the appended claims shall not be limited to their common or dictionary meanings but rather shall be interpreted to the meanings and concepts that are in agreement with the technical idea of the present disclosure, based on the principle that the inventor may suitably define the concept of a term to describe the invention in the best possible way.

Moreover, in the present disclosure, any expression in the singular form shall also encompass the meaning of the plural form, unless explicitly described otherwise.

FIG. 1 is a block diagram illustrating a haptic generator in accordance with an embodiment of the present disclosure.

Referring to FIG. 1, a haptic generator 100 may include a haptic device 10, a driving circuit 20, and a driving signal generator 25. The haptic device 10 may be configured to generate vibrations caused by an electric current applied from the driving circuit 20. The driving circuit 20 may be configured to receive a driving signal and provide the electric current to the haptic device 10 pursuant to the received driving circuit. The driving signal generator 25 may be configured to receive a haptic driving signal or a sound signal and convert the received haptic driving signal or sound signal to a driving signal for giving an appropriate haptic effect for the haptic driving signal or sound signal.

The driving signal may include an impact driving signal and an inertia driving signal. In the case where the driving signal is the impact driving signal, the haptic device 10 may be configured to cause impact vibrations to be generated, and in the case where the driving signal is the inertia driving signal, the haptic device 10 may be configured to cause rotational inertia vibrations to be generated.

Figure 2:
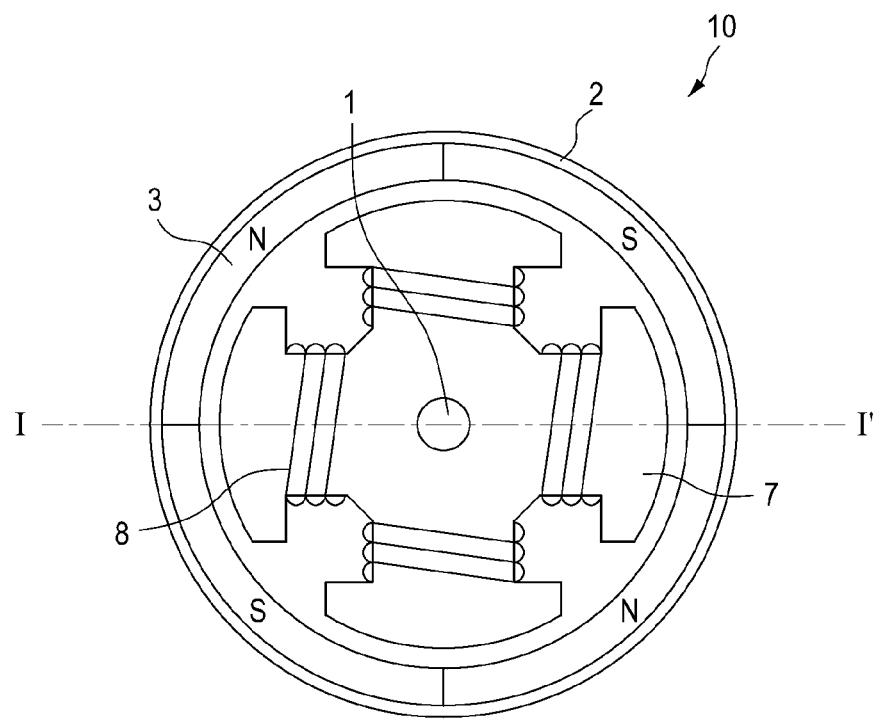
FIG. 2 is a top view of a haptic device in accordance with an embodiment of the present disclosure.
Figure 3:
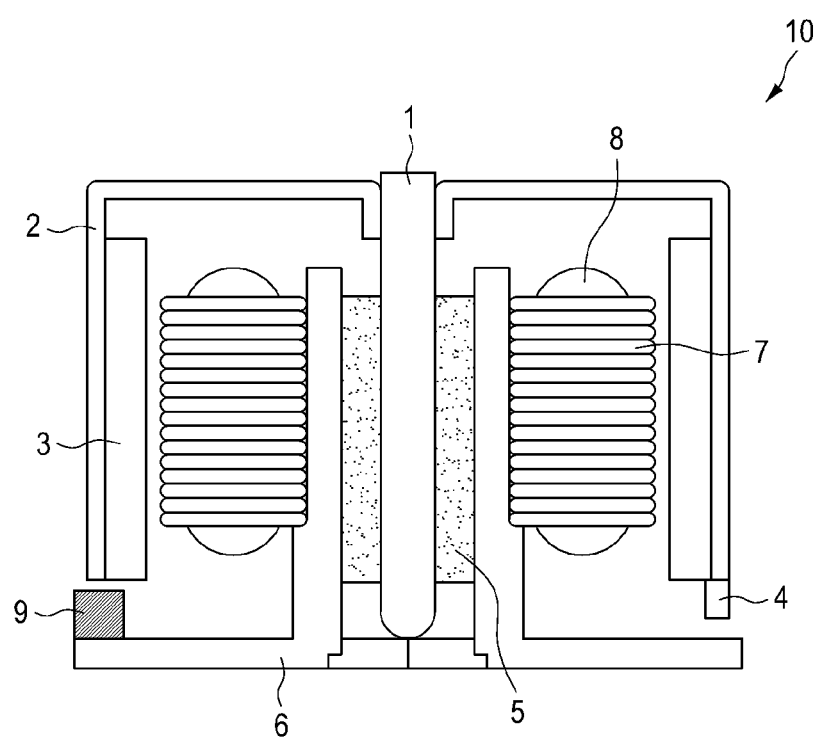
FIG. 3 is a cross-sectional view of the haptic device, across the I-I' line, shown in FIG. 2.

FIG. 2 is a top view of a haptic device in accordance with an embodiment of the present disclosure, and FIG. 3 is a cross-sectional view of the haptic device, across the I-I' line, shown in FIG. 2.

Referring to FIG. 2 and FIG. 3, the haptic device 10 may include a rotary shaft 1, a stator unit, and a rotor unit configured to rotate about the stator unit.

The rotary shaft 1 may be arranged at a center portion of the rotor unit. The rotary shaft 1 may be rotatably coupled to the stator unit.

The rotor unit may be connected to the rotary shaft 1 to rotate. The rotor unit may include a rotor case 2, a magnet 3, and a protrusion 4. The rotor case 2 may provide a space at an inside thereof. The magnet 3 may be secured to an inner circumferential surface of the rotor case 2. The magnet 3 may have multiple magnetic poles. The magnet 3 may be coupled to the inner circumferential surface of the rotor case 2. The magnet 3 may rotate together with the rotor case 2.

The protrusion 4 may be provided at the rotor unit to rotate. The stator unit may include a holder 6, winding cores 7, coils 8, and a stopper 9. The holder 6 may be rotatably provided with the rotary shaft 1 within a center portion thereof.

The winding cores 7 may be coupled to the holder 6. The winding cores 7 may have the coils 8 wound thereon. The winding cores 7 may each be made of a magnetic material to increase the magnetic efficiency of the coil 8 wound thereon. However, the present disclosure is not limited to what is described herein, and the winding cores 7 may each be made of a non-magnetic material or omitted altogether for cost reduction or size reduction or may be integrated with the holder 6. The coils 8 may be spaced apart from the magnet 3 and may be configured to generate an electromagnetic force with the magnet 3 to rotate the rotor unit.

In another embodiment of the present disclosure, where the winding cores 7 are omitted, the coils 8 may be secured to a structure of the stator unit.

The stator unit may further include a bearing 5. The rotary shaft 1 may be inserted into a hole within the bearing 5.

The rotor unit may be readily controlled when the number of coils 8 and the number of magnetic poles of the magnet 3 meet a certain condition. This will be described later in further detail.

In the case where the coils 8 are provided in a plural number, the coils 8 may be connected with one another or divided from one another to be powered by the same driving circuit 20 (see FIG. 1). Nonetheless, it shall be appreciated that the present disclosure is not limited to what is described herein and that the coils 8 may each be powered by a different driving circuit.

The stopper may be arranged to collide with the protrusion 4 to obstruct the rotation of the protrusion 4 and cause an impact when the rotor unit rotates. In the haptic generator 100 in accordance with an embodiment of the present disclosure, the rotor unit may rotate less than 360 degrees since the stopper 9 collides with the protrusion 4 and generates an impact vibration.

The haptic device 10 in accordance with an embodiment of the present disclosure is described herein as the magnet 3 being included in the rotor unit and the coils 8 and the winding cores 7 being included in the stator unit. Nonetheless, it shall be appreciated that the present disclosure is not limited to this configuration and that it is also possible under the same principle that the coils are included in the rotor unit and the magnet is included in the stator unit.

Figure 4A:
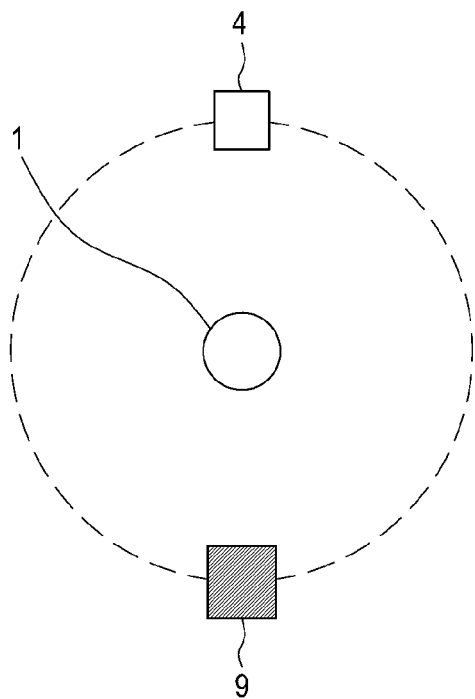
FIG. 4A to FIG. 4C are diagrams for illustrating how an impact vibration is generated by a haptic generator.
Figure 4B:
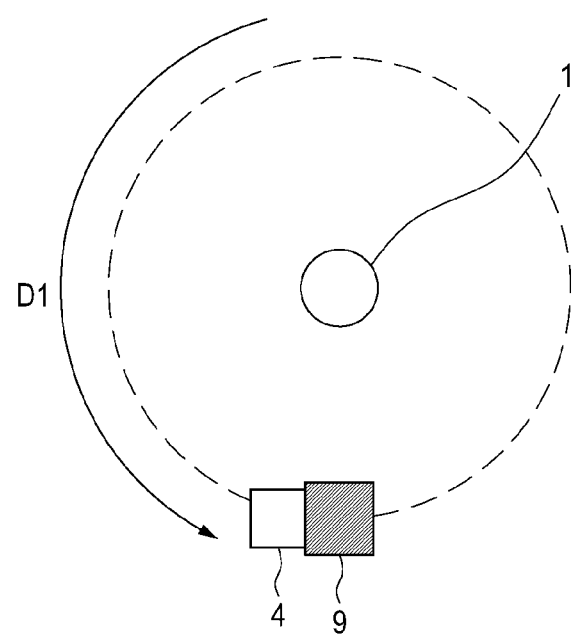
Figure 4C:
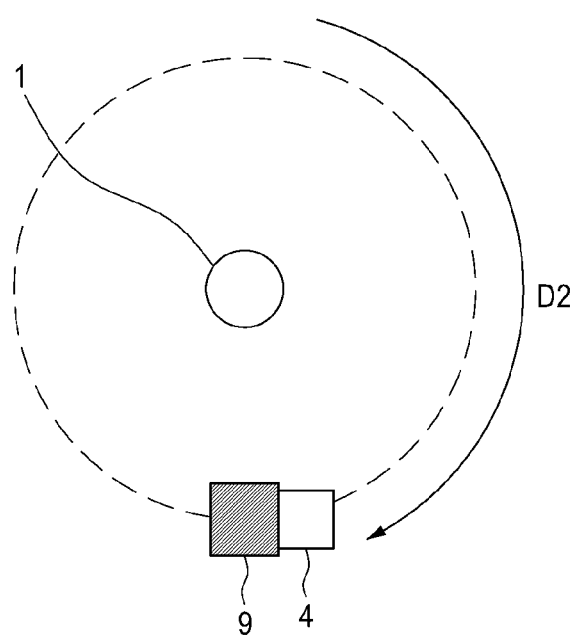

FIG. 4A to FIG. 4C are diagrams for illustrating how impact vibrations are generated by the haptic generator.

In the top view, the protrusion 4 may rotate along the rotational path, indicated with the broken line, about the rotary shaft 1 to collide with the stopper 9 and generate impact vibrations. For example, by rotating the protrusion 4 counterclockwise D1 in the state depicted in FIG. 4A, the protrusion 4 may collide with one side of the stopper 9, as depicted in FIG. 4B. Then, by rotating the protrusion 4 clockwise D2, the protrusion 4 may collide with the other side of the stopper 9, as depicted in FIG. 4C.

Defining T as a cycle at which the protrusion 4 makes 1 revolution from the position shown in FIG. 4B to the position shown in FIG. 4C, the frequency at which the protrusion 4 collides with the stopper 9 will be the inverse of T. When the rotor unit rotates at a maximum speed, the inverse of T is the maximum frequency at which the protrusion 4 may rotationally reciprocate and generate impact vibrations.

Figure 5A:
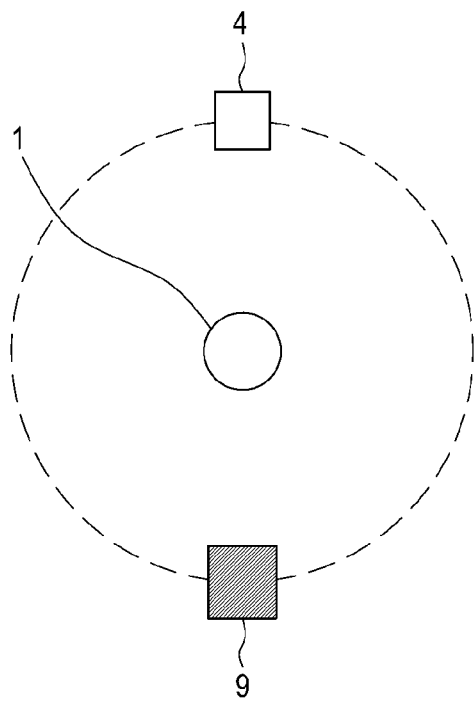
FIG. 5A to FIG. 5C illustrate how rotational inertia vibration are generated by a haptic generator.
Figure 5B:
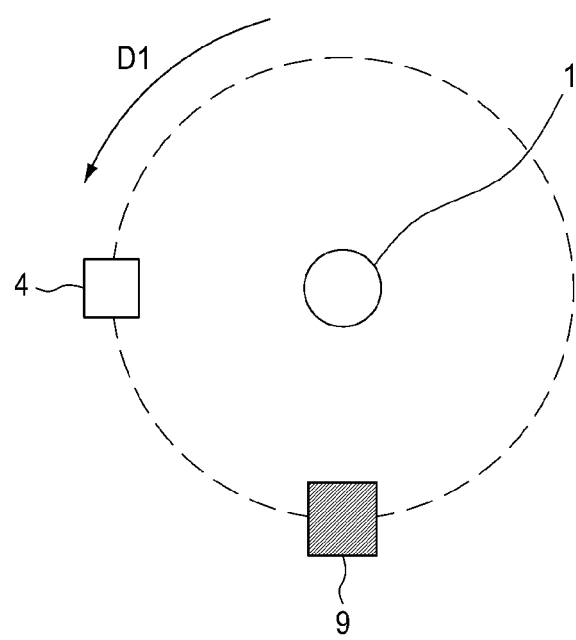
Figure 5C:
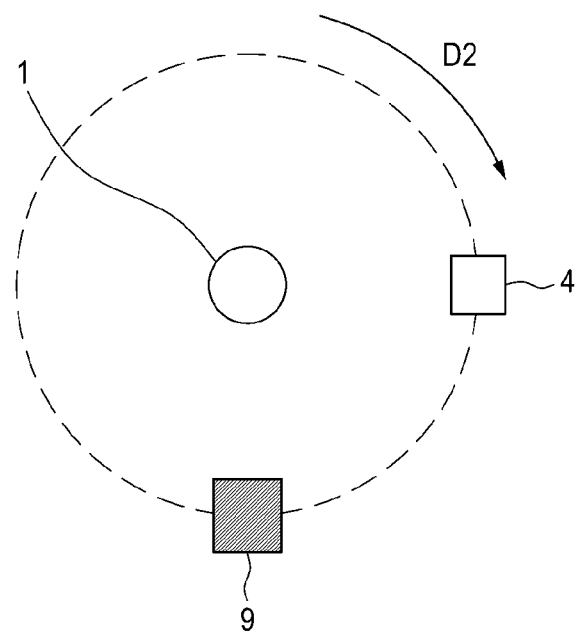

The haptic generator in accordance with an embodiment of the present disclosure may generate not only impact vibrations but also rotational inertia vibrations. FIG. 5A to FIG. 5C illustrate how rotational inertia vibrations are generated by the haptic generator. Hereinafter, the rotational inertia vibrations of the haptic generator will be described with reference to FIG. 5A to FIG. 5C.

If the rotor unit changes its rotation in the counterclockwise/clockwise direction while rotating in the clockwise/counterclockwise direction, vibrations are caused by a collision between a rotational inertia for continuing the rotating direction and energy for reversing the rotating direction. Likewise, vibrations are also caused if the rotor unit is forced to stop rotating. Such vibrations are defined herein as rotational inertia vibrations. The rotational inertia vibrations generated by the haptic generator 100 of the present disclosure may be caused by the principle of action and reaction of the rotational inertia of the rotor unit.

The intensity of the rotational inertia vibrations increases when the rotor unit rotates with a stronger energy and is proportional to the rotating speed of the rotor unit. Moreover, the intensity of the rotational inertia vibrations is proportional to the magnitude of energy variation when the rotor unit changes its rotating direction or stops rotating. Therefore, the rotational inertia vibrations may be decreased if the rotor unit gradually decelerates to stop its rotation or gradually accelerates its rotation in the opposite direction after a full stop.

Assuming that FIG. 5A depicts an initial position of the protrusion 4, the rotor unit is rotated counterclockwise D1, as illustrated in FIG. 5B. Then, before the protrusion 4 stops rotating or collides with one side of the stopper 9, the rotor unit may be forced to stop rotating or reverse its rotation in the clockwise direction D2, as shown in FIG. 5C, to cause rotational inertia vibrations.

The rotational inertia vibrations generated by the haptic generator 100 of the present disclosure have a different principle and a different effect than vibrations caused by the rotation of an eccentric mass in the conventional ERM (eccentric rotating mass) motor or by linear resonating motions of a weight connected to an elastic body in an LRA (linear resonant actuator).

Similarly, before the protrusion 4 of the rotor unit rotating in the clockwise direction D2, as shown in FIG. 5C, stops rotating or collides with the other side of the stopper 9, the rotor unit may be forced to stop rotating or to reverse its rotation in the counterclockwise direction D1, as illustrated in FIG. 5B, to cause rotational inertia vibrations.

With the haptic generator 100 in accordance with an embodiment of the present disclosure, the single haptic device 10 may be used to provide the user with impact vibrations and rotational inertia vibrations having different sensations. Accordingly, it is possible to provide a greater variety of realistic haptic feedback to the user.

When the haptic generator 10 generates the rotations inertia vibrations, the angle of rotation of the protrusion 4 may be smaller than the angle of rotation of the protrusion 4 when the haptic generator 10 generates the impact vibrations.

In an embodiment of the present disclosure, if the rotating speed of the rotor unit is constant, the frequency at which the haptic generator 100 generates the rotational inertia vibrations may be greater than the frequency at which the haptic generator 100 generates the impact vibrations. Moreover, the cycle at which the haptic generator 100 generates the rotational inertia vibrations may be smaller than the cycle at which the haptic generator 100 generates the impact vibrations. Furthermore, the frequency and the cycle may each be individually controlled for the rotational inertia vibrations and the impact vibrations.

The rotational inertia vibrations and the impact vibrations generated by the haptic generator 100 may have frequencies and cycles that are different from each other. Nevertheless, since it is possible to control the frequencies and the cycles individually when generating the rotational inertia vibrations and the impact vibrations, the impact vibrations and the rotational inertia vibrations may be selectively generated by, for example, controlling the cycle under the same frequency.

In an embodiment of the present disclosure, it is possible to adjust the intensity and type of the rotational inertia vibrations of the haptic generator 100. The intensity of the rotational inertia vibrations may be controlled by adjusting the speed of the rotor unit and the angle of rotation of the protrusion 4. The type of the rotational inertia vibrations may be controlled by adjusting the cycle at which the rotor unit rotationally reciprocates or adjusting the variation of speed or energy at the moments the rotor unit reverses its rotating direction. The following description provides a more detailed method of controlling the rotational inertia vibrations in the haptic generator 100.

Figure 6:
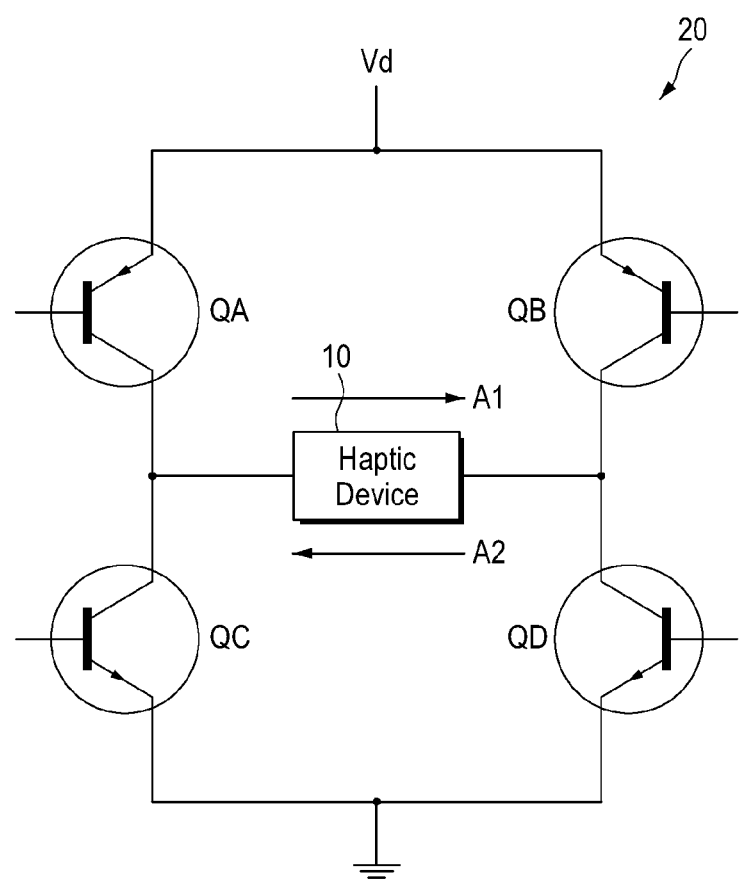
FIG. 6 illustrates a haptic device and a driving circuit for applying a current to the haptic device.

FIG. 6 illustrates a haptic device and a driving circuit for applying a current to the haptic device. In FIG. 6, a bridge circuit is illustrated as an example of the driving circuit 20.

Referring to FIG. 6 together with FIG. 2 and FIG. 3, the electric current flowing through the coils 8 of the haptic generator 100 may be applied by the driving circuit 20. The driving circuit 20 may be provided on a circuit board, which may be provided inside or outside a package comprising the haptic device 10.

The rotating direction of the rotor unit of the haptic generator 100 may be determined according to the direction of the electric current applied to the coils 8 of the haptic device 10.

The driving circuit 20 may include first to fourth transistors QA, QB, QC, QD, each being turned on or off by a control signal.

By turning on the first transistor QA and the fourth transistor QD and turning off the second transistor QB and the third transistor QC, the electric current will flow in a first direction A1 in the haptic generator 100. By turning on the second transistor QB and the third transistor QC and turning off the first transistor QA and the fourth transistor QD, the electric current will flow in a second direction A2, which is opposite to the first direction A1, in the haptic generator 100. By turning on or off the first to fourth transistors QA, QB, QC, QD, it is possible to change the flowing direction of the electric current in the haptic generator 100 and control the rotating direction of the rotor unit.

The rotational inertia vibrations of the haptic generator 100 may be generated not only by changing the rotating direction of the rotor unit but also through a braking motion. Referring to FIG. 6, while the electric current is flowing in the haptic generator 100 in the first direction A1 or second direction A2, the third transistor QC and the fourth transistor QD may be turned on, and the first transistor QA and the second transistor QB may be turned off. By this, a force of interrupting the rotation of the rotor unit of the haptic generator 100 may be generated and may result in the braking motion.

Figure 7A:
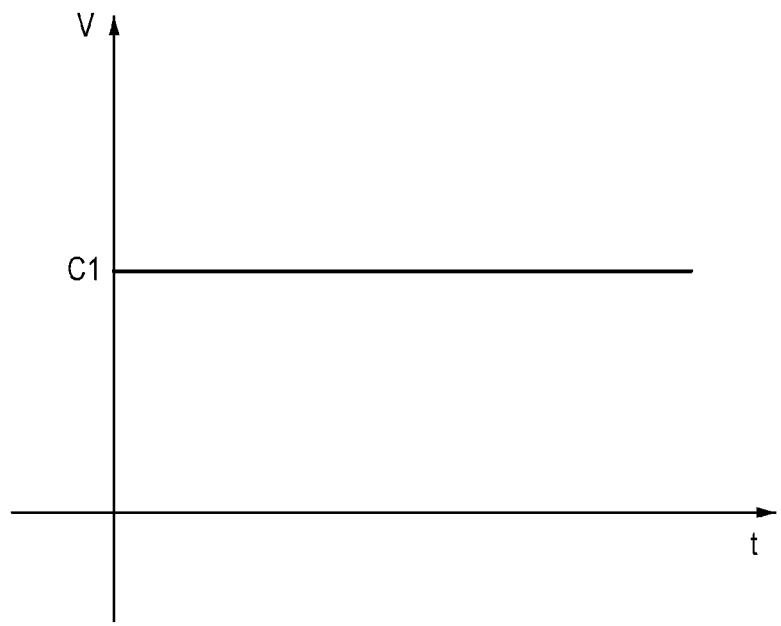
FIG. 7A and FIG. 7B illustrate examples of control signals being provided to the first and fourth transistors of FIG. 6 to control the rotation speed of the rotor unit.
Figure 7B:
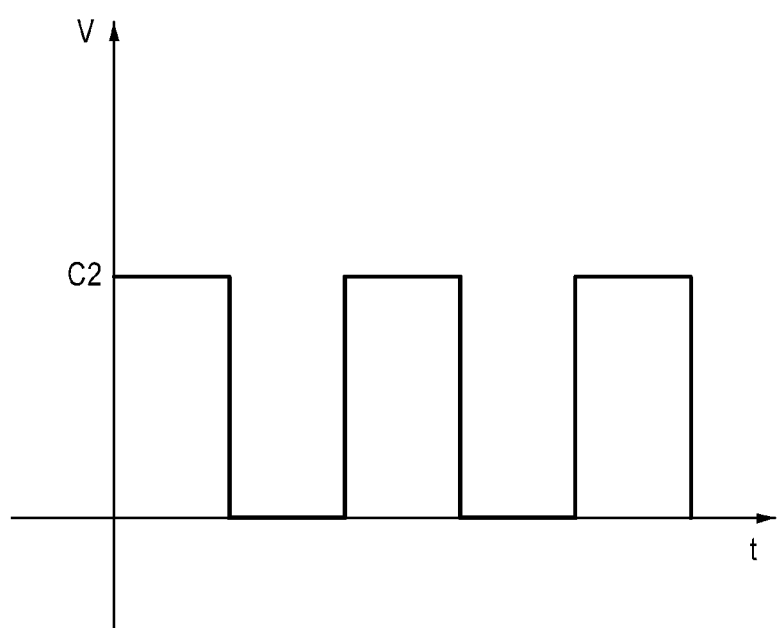

The following description explains how the rotating speed of the rotor unit may be controlled in the haptic device 100 of the present disclosure. FIG. 7A and FIG. 7B illustrate examples of control signals being provided to the first and fourth transistors of FIG. 6 to control the rotating speed of the rotor unit.

In an embodiment of the present disclosure, the rotating speed of the rotor unit may be controlled by adjusting the electric current flowing in the coils of the haptic generator 100. Specifically, by controlling the duty ratio at which control signals provided to the transistors shown in FIG. 6 are turned on and off, the supply of the electric current may be controlled, and the magnitude of the electric current may be adjusted.

Taking the example of the electric current flowing in the haptic device 10 in the first direction A1 in FIG. 6, a greater amount of electric current may flow in the haptic device 10 when the control signal C1 of FIG. 7A is applied to a control terminal of each of the first transistor QA and the fourth transistor QD than when a signal with a smaller duty ratio, such as the control signal C2 shown in FIG. 7B, is applied. The rotating speed and/or the magnitude of the rotational energy may be controlled by controlling the amount of electric current.

In an embodiment of the present disclosure, the rotating speed of the rotor unit may be controlled by repeatedly providing the electric current to the coils of the haptic device 10 in a particular direction and making a braking motion while the rotor unit rotates without changing the rotating direction. Here, as the rotational inertia vibrations may be generated when the braking motion is made, the rotating angles of the rotor unit may be kept in a small range, and yet a high frequency of the rotational inertia vibrations may be obtained.

Similarly, when the electric current is supplied to the coils of the haptic device 10 in a particular direction, the duty ratio of the control signals may be also controlled for the transistors, as described above. Moreover, after the braking motion is made, there may be an additional idle period of turning off all of the first to fourth transistors QA, QB, QC, QD.

According to an embodiment of the present disclosure, by controlling the speed and direction of the rotor unit of the haptic generator 100, not only may the frequency and cycle of the rotor unit be controlled, but the impact vibrations and the rotational inertia vibrations may be selectively generated by adjusting the duty ratio without changing the cycle, and the intensity of the rotational inertia vibrations may be controlled.

Figure 8:
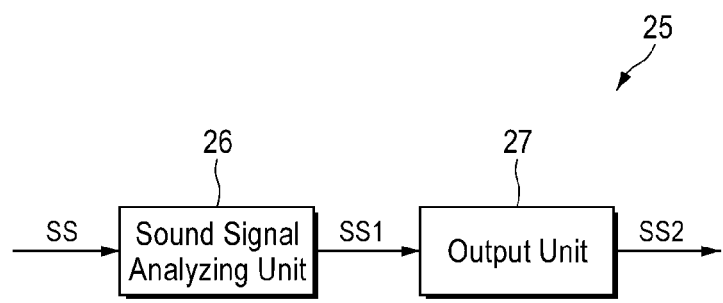
FIG. 8 is a block diagram illustrating the driving signal generator shown in FIG. 1.

FIG. 8 is a block diagram illustrating the driving signal generator 25 shown in FIG. 1. Referring to FIG. 1, the driving signal generator 25 in accordance with an embodiment of the present disclosure may include a sound signal analyzing unit 26 and an output unit 27.

The sound signal analyzing unit 26 may be configured to receive a sound signal SS and analyze various properties of the received sound signal. The properties of the sound signal may include categorical properties, such as frequency, magnitude, and envelope, and cognitive properties, such as roughness, loudness, and sharpness.

The output unit 27 may be configured to receive the properties SS1 of the sound signal, generate an impact driving signal and an inertia driving signal from a plurality of different properties of the sound signal, and output a driving signal SS2. For instance, the output unit 27 may generate the impact driving signal based on the frequency of the sound signal and the inertia driving signal based on the envelope of the sound signal.

Any single property of the sound signal may be further divided into a number of different properties, which may be also defined as a plurality of the sound signal. For example, frequency may be further divided into high frequency and low frequency based on the frequency band, and the impact driving signal may be generated based on the low-frequency signal of the sound signal while the inertia driving signal may be generated based on the high-frequency signal of the sound signal. Furthermore, the low-frequency band and the high-frequency band may be divided into a plurality of bands, and the impact vibrations and the rotational inertia vibrations may be generated with different frequencies to correspond to the frequency bands.

According to an embodiment of the present disclosure, the impact vibrations of the haptic device generated by the impact driving signal and the rotational inertia vibrations of the haptic device generated by the inertia driving signal may be conveyed to the user quite differently from each other. Of the various properties of the sound signal, certain properties are suitable for rendering with impact vibrations while other properties are suitably expressed with rotational inertia vibrations. With the haptic generator in accordance with an embodiment of the present disclosure, a greater variety of realistic haptic feedback may be provided to the user by conveying impact vibrations and rotational inertia vibrations to the user based on various properties of the sound signal.

Figure 9:
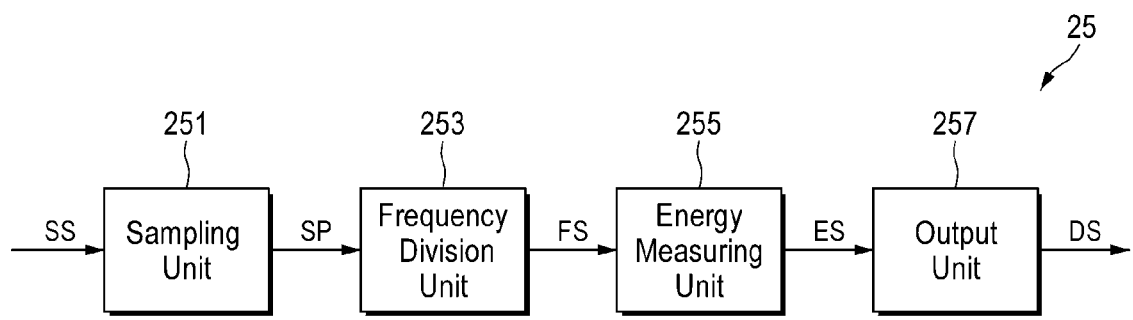
FIG. 9 is a block diagram illustrating the driving signal generator shown in FIG. 1.

FIG. 9 is a block diagram illustrating the driving signal generator 25 shown in FIG. 1. Referring to FIG. 9, the driving signal generator 25 in accordance with an embodiment of the present disclosure may include a sampling unit 251, a frequency division unit 253, an energy measuring unit 255, and an output unit 257.

The sampling unit 251 may be configured to receive the sound signal SS, sample the received sound signal SS, and output the sampled signal SP. The sampling unit 251 may perform the sampling in a particular time unit to facilitate real-time signal processing.

The frequency division unit 253 may be configured to receive the sampled signal SP and divide the received sampled signal SP into a plurality of frequency bands. The frequency division unit 253 may be configured to divide the sampled signal SP into a low-frequency signal and a high-frequency signal to generate a frequency signal FS. For example, the frequency band of the low-frequency signal may be 0-200 Hz, and the frequency band of the high-frequency signal may be 200-400 Hz. Moreover, the frequency division unit 253 may be configured to divide the high-frequency signal into frequency bands of a plurality of sub-high-frequency signals, for example, 200-400 Hz, 400-800 Hz, 800-1600 Hz, 1600-3200 Hz, and 3200-6400 Hz.

The energy measuring unit 255 may be configured to receive the frequency signal FS and to calculate energy for each of the bands of the low-frequency signal and the high-frequency signal and output an energy signal ES. The energy measuring unit 255 may calculate the energy based on loudness, roughness, and sharpness, which are cognitive properties of a sound. Moreover, the energy measuring unit 255 may calculate properties such as envelope or magnitude.

Loudness is a subjective acoustic element related to the size of a sound and may be measured using, for example, a Zwicker model. Roughness is an acoustic element relating to how rough the sound is perceived. If a sound is amplitude-modulated or frequency-modulated over 20 Hz, human ears cannot notice the variation of the sound but generally will perceive a rough impression, and this kind of sense of hearing is defined herein as roughness.

In an embodiment of the present disclosure, the energy measuring unit 255 may generate the energy signal by comparing, for example, the loudness and roughness measured from the current sampled signal against the loudness and roughness measured from a previous sampled signal. In another embodiment, the energy measuring unit 255 may output the energy signal by comparing the absolute values of the loudness and roughness measured from the current sampled signal against predetermined data (e.g., a look-up table).

The energy signal ES measured by the energy measuring unit 255 may be a basis for determining whether a haptic effect will be provided and/or the order of haptic effects to be provided.

The output unit 257 may be configured to generate a driving signal DS, which is defined with the frequency and duty ratio corresponding to the electric current applied to the haptic device 10, based on the frequency signal FS and the energy signal ES.

The driving signal DS may include an impact driving signal and an inertia driving signal. When the impact driving signal is outputted by the output unit 257, the haptic device 10 may generate impact vibrations based on the corresponding frequency and duty ratio, and when the impact driving signal is outputted by the output unit 257, the haptic device 10 may generate rotational inertia vibrations based on the corresponding frequency and duty ratio.

FIG. 10A to FIG. 10D illustrate impact driving signals and inertia driving signals. The exemplary signals shown in FIG. 10A to FIG. 10D are for alternately rotating the rotor unit of the haptic device 10 clockwise and counterclockwise. For the sake of easier understanding, the rotating speed of the rotor unit of the haptic device 10 will be assumed to be constant.

Figure 10A:
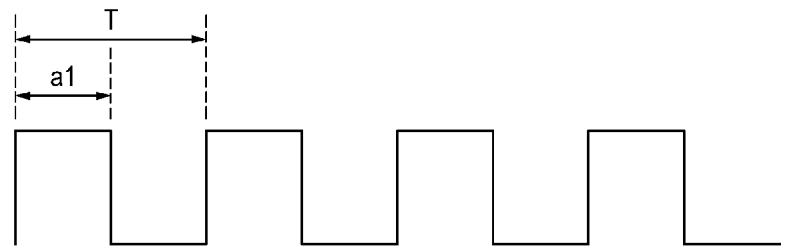
FIG. 10A to FIG. 10D illustrate impact driving signals and inertia driving signals.
Figure 10B:
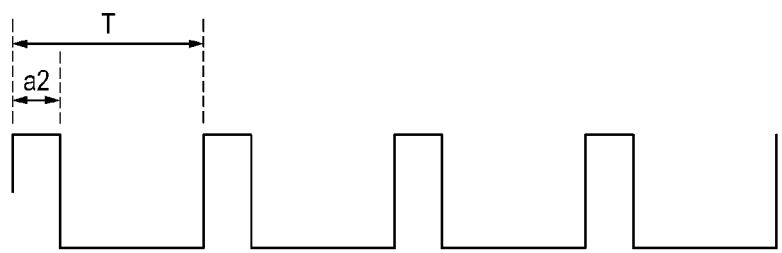

Assuming that the inertia driving signal and the impact driving signal have a same frequency, the duty ratio of the impact driving signal may be greater than the duty ratio of the inertia driving signal. Here, the duty ratio means the ratio of time for which the electric current is applied within a cycle. In an embodiment of the present disclosure, the signal depicted in FIG. 10A may be an impact driving signal, and the signal depicted in FIG. 10B may be an inertia driving signal. In FIG. 10A and FIG. 10B, the duty ratio of the impact driving signal is a1/T, and the duty ratio of the inertia driving signal is a2/T.

The duty ratio of the driving signal is proportional to the time for which electric current is applied to the haptic device 10. Since the rotational inertia vibrations are caused by stopping the rotation of the rotor unit before the protrusion collides with the stopper, the time for which electric current is applied for the rotational inertia vibrations may be shorter than the time required for applying the electric current to generate the impact vibrations by having the protrusion and the stopper collide with each other.

Figure 10C:
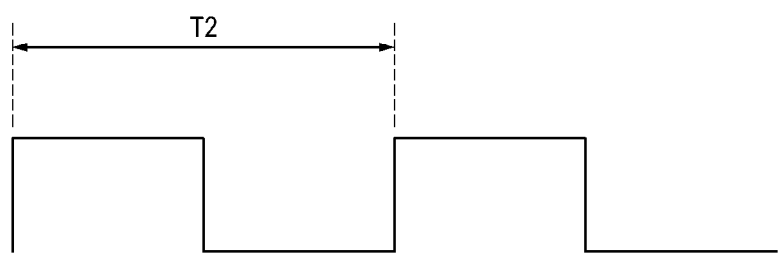
Figure 10D:
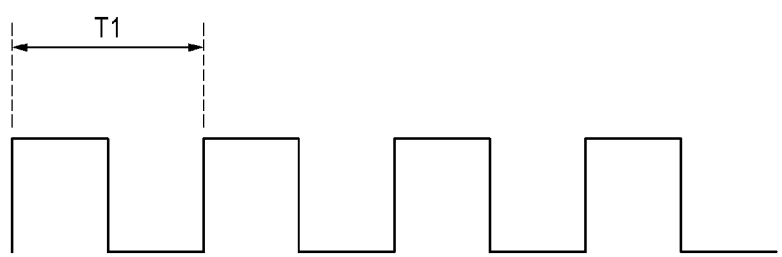

Assuming that the inertia driving signal and the impact driving signal have a same duty ratio, the frequency of the impact driving signal may be lower than the frequency of the inertia driving signal. In an embodiment of the present disclosure, the signal depicted in FIG. 10C may be an impact driving signal, and the signal depicted in FIG. 10D may be an inertia driving signal. In FIG. 10C and FIG. 10D, the frequency of the impact driving signal is 1/T2, and the frequency of the inertia driving signal is 1/T1.

The frequency of the driving signal is inversely proportional to the time for which the rotor unit rotates in a particular direction. Since the rotational inertia vibrations are caused by stopping the rotation of the rotor unit before the protrusion collides with the stopper, the time for which the rotor unit rotates in a particular direction for generating the rotational inertia vibrations may be shorter than the time required for generating the impact vibrations by having the protrusion and the stopper collide with each other.

The low-frequency component of a sound should be rendered using the impact vibrations to provide the user with a natural haptic effect. Accordingly, the output unit 257 may convert a relatively low frequency signal to the impact driving signal based on the frequency signal FS.

The high-frequency component of a sound should be rendered using the rotational inertia vibrations to provide the user with a natural haptic effect. Accordingly, the output unit 257 may convert a relatively high frequency signal to the inertia driving signal based on the frequency signal FS.

The output unit 257 may set the frequencies of the inertia driving signals corresponding to the sub-high-frequency signals. While a number of sub-high-frequency signals of the high-frequency signal may be rendered as the rotational inertia vibrations, different haptic effects may be provided to the user by differentiating the frequency of the rotor unit of the haptic device 10.

Figure 11:
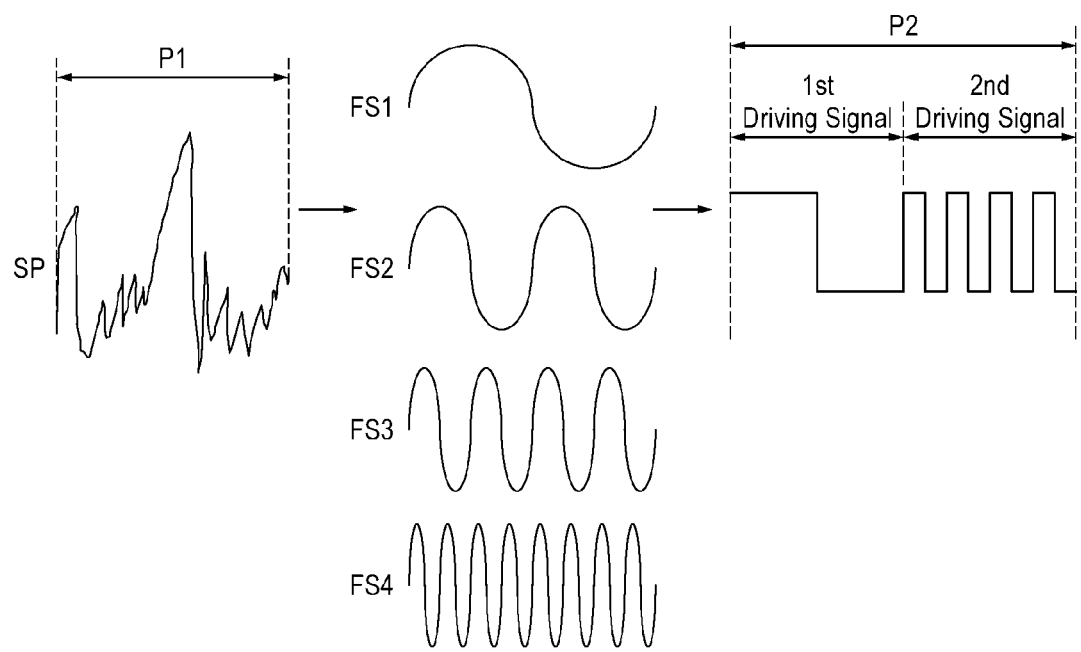
FIG. 11 illustrates the function of the driving signal generator.

FIG. 11 illustrates the function of the driving signal generator 25. The output unit 257 may determine whether a haptic effect will be provided and/or the order of haptic effects to be provided, based on the energy of the measured frequency signal FS. The output unit 257 may convert the frequency signal FS to the driving signal if the energy of the frequency signal FS is higher than a predetermined threshold. However, if the energy of the frequency signal FS is lower than the predetermined threshold, the output unit 257 may not convert the frequency signal FS to the driving signal.

Referring to FIG. 9 and FIG. 11, it is assumed herein that the sampled signal SP in a first period P1 is divided into 4 frequency bands by the frequency division unit 253. It is also assumed that a first frequency signal FS1 is a low-frequency signal and that second to fourth frequency signals FS2, FS3, FS4 are high-frequency signals having different frequency bands. Here, it is further assumed that the energy of the first frequency signal FS1>the energy of the second frequency signal FS2>the energy of the third frequency signal FS3>the energy of the fourth frequency signal FS4, that the energy of each of the first to third frequency signals FS1, FS2, FS3 is greater than a predetermined threshold, and that the energy of the fourth frequency signal FS4 is smaller than the predetermined threshold. In such a case, the output unit 257 may not convert the fourth frequency signal FS4 to a driving signal.

In the case where the frequency band of the frequency signal FS is divided into multiple frequency bands, the output unit 257 may select the haptic driving signal corresponding to a sampling section of the sampled signal based on the energy of the frequency signal FS.

The output unit 257 may output the driving signal during a second period P2, which corresponds to the first period P1 of the sampled signal SP. Here, the output unit 257 may include different driving signal that may realize a plurality of haptic effects within the second period P2. Nonetheless, the number of driving signals included during the second period P2 may be different from the number of frequency signals divided by the frequency division unit 253.

The order or priority of the driving signals to be included in the second period P2 may be determined based on the magnitude of energy of the frequency signal. In FIG. 11, it was assumed that the first to third frequency signals FS1, FS2, FS3 have successively smaller energy and that 2 driving signals are to be included in the second period P2. Here, the output unit 257 may output a first driving signal converted from the first frequency signal FS1 and a second driving signal converted from the second frequency signal FS2 but may not convert the third frequency signal FS3.

With the haptic generator in accordance with an embodiment of the present disclosure, the impact vibrations and rotational inertia vibrations of the haptic device may be rendered based on various properties of a sound signal. Therefore, by providing a haptic feedback suitable for the properties of the sound signal, the user may experience a greater variety of realistic haptic effect.

Figure 12:
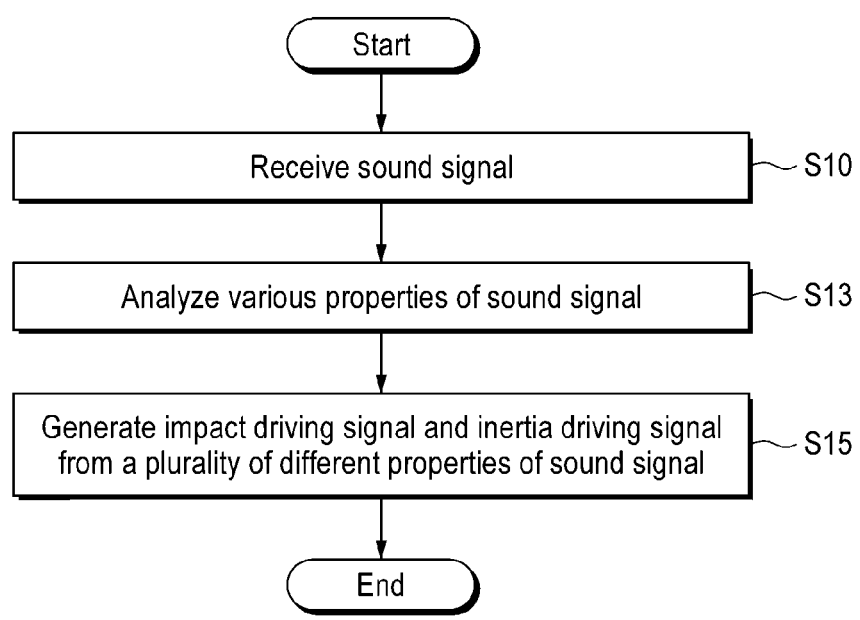
FIG. 12 is a flow diagram illustrating a driving method of a haptic generator in accordance with an embodiment of the present disclosure.

FIG. 12 is a flow diagram illustrating a driving method of the haptic generator in accordance with an embodiment of the present disclosure.

Referring to FIG. 12, the driving method of the haptic generator may include: receiving a sound signal (S10); analyzing various properties of the sound signal (S13); and generating an impact driving signal and an inertia driving signal from a plurality of different properties of the sound signal (S15). The steps shown in FIG. 12 are described above with reference to FIG. 8 and thus will not be described redundantly herein.

Figure 13:
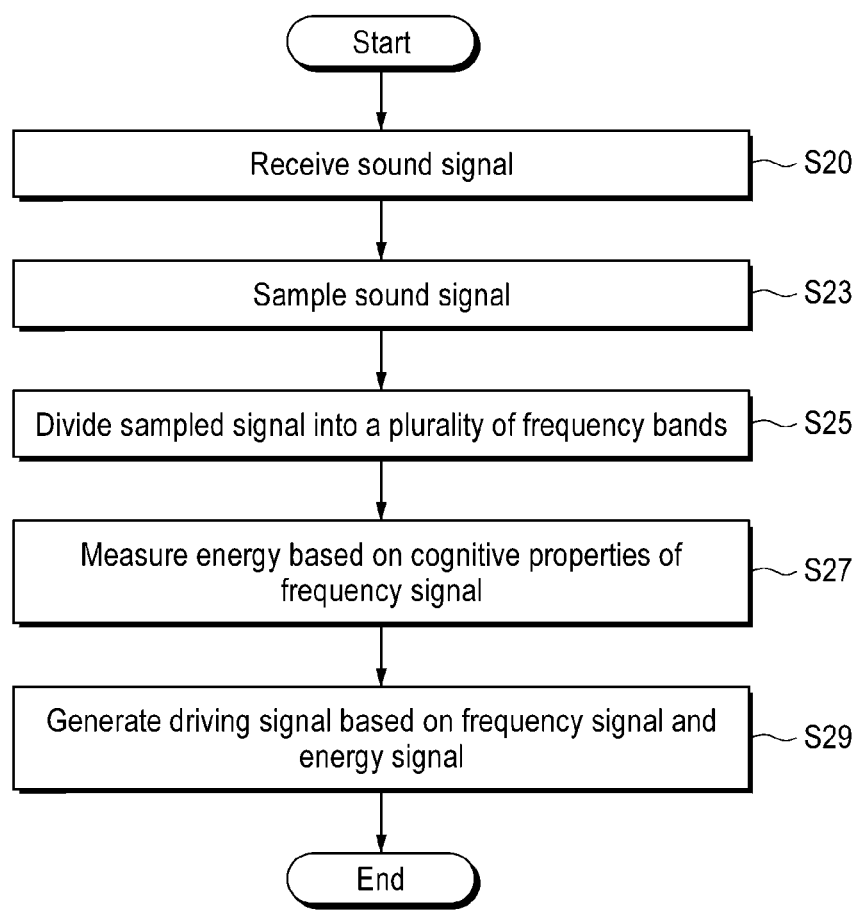
FIG. 13 is a flow diagram illustrating a driving method of a haptic generator in accordance with an embodiment of the present disclosure.

FIG. 13 is a flow diagram illustrating a driving method of the haptic generator in accordance with an embodiment of the present disclosure.

Referring to FIG. 13, the driving method of the haptic generator may include: receiving a sound signal (S20); sampling the received sound signal in a particular time unit to output a sampled signal (S23); receiving the sampled signal and dividing the received sampled signal into a plurality of frequency bands to generate a frequency signal (S25); receiving the frequency signal and measuring energy based on cognitive properties of the frequency signal to output an energy signal (27); and generating a driving signal based on the frequency signal and the energy signal (S29).

The steps illustrated in FIG. 13 have been described in detail with reference to FIG. 9 to FIG. 11 and thus will not be redundantly described herein.

Hitherto, certain embodiments of the present disclosure have been described in detail, but it shall be appreciated that the present disclosure is by no means limited to the described embodiments and that the present disclosure may be embodied in various ways without departing from the technical ideas of the present disclosure. Accordingly, it shall be appreciated that the embodiments are not described for limiting the technical ideas of the present disclosure but provided for illustrative purposes only and that the scope of the technical ideas of the present disclosure are not limited by the described embodiments. Therefore, the described embodiments shall be understood to be exemplary in all aspects and not restrictive. The scope of the present disclosure shall be defined by the claims appended below, and any and all technical ideas within the equivalent scope shall be interpreted to be included in the scope of the present disclosure.

What is claimed is:

1. A haptic generator, comprising:
    a driving signal generator configured to receive a sound signal and generate a driving signal, the driving signal comprising an impact driving signal and an inertia driving signal; and
    a haptic device configured to output an haptic effect pursuant to the driving signal,
    wherein the haptic device comprises:
        a stator unit including a stopper; and
        a rotor unit including a protrusion and configured to rotate about the stator unit, wherein the rotor unit is configured to rotationally reciprocate within a range of 360 degrees,
    wherein the haptic device is configured to generate impact vibrations pursuant to the impact driving signal and generate rotational inertia vibrations pursuant to the inertia driving signal, and
    wherein the impact driving signal and the inertia driving signal are generated based on properties of the sound signal that are, respectively, different from each other.

2. The haptic generator as set forth in claim 1, wherein the impact vibrations are generated by a collision of the stopper and the protrusion, and wherein the rotational inertia vibrations are generated by forcing the protrusion to stop rotating before colliding with the stopper or by reversing the rotation of the protrusion.

3. The haptic generator as set forth in claim 1, wherein the impact driving signal has a frequency that is relatively lower than a frequency of the inertia driving signal, and the impact driving signal has a duty ratio that is relatively greater than a duty ratio of the inertia driving signal.

4. The haptic generator as set forth in claim 1, wherein the properties of the sound signal include frequency, magnitude, envelope, roughness, loudness, and sharpness.

5. The haptic generator as set forth in claim 1, wherein the impact driving signal is generated based on a low-frequency signal of the sound signal, and the inertia driving signal is generated based on a high-frequency signal of the sound signal.

6. The haptic generator as set forth in claim 1, wherein the driving signal generator comprises:
a sampling unit configured to receive the sound signal and sample the received sound signal in a particular time unit to output a sampled signal;
a frequency division unit configured to receive the sampled signal and divide the sampled signal into a plurality of frequency bands to generate a frequency signal;
an energy measuring unit configured to receive the frequency signal and generate an energy signal based on cognitive properties of the frequency signal; and
an output unit configured to generate the driving signal based on the frequency signal and the energy signal.

7. The haptic generator as set forth in claim 6, wherein the cognitive properties include loudness and roughness.

8. The haptic generator as set forth in claim 6, wherein the frequency division unit is configured to divide a high-frequency signal of the sampled signal into a plurality of sub high-frequency signals, and
wherein the output unit is configured to set frequencies of inertia driving signals corresponding to the sub high-frequency signals to be different from one another.

9. The haptic generator as set forth in claim 6, wherein the output unit is configured to convert the frequency signal to the driving signal if energy of the frequency signal is greater than a predetermined threshold based on the energy signal and not to convert the frequency signal to the driving signal if energy of the frequency signal is smaller than the predetermined threshold based on the energy signal.

10. The haptic generator as set forth in claim 6, wherein the output unit is configured to output the driving signal during a second period corresponding to a first period of the sampled signal, and
wherein the output unit is configured to determine a priority of the driving signal to be included in the second period, based on a magnitude of energy of the frequency signal.

11. A method of driving a haptic generator, comprising:
receiving a sound signal;
analyzing various properties of the sound signal; and
generating an impact driving signal and an inertia driving signal based on a plurality of different properties of the sound signal,
wherein the haptic generator comprises a haptic device configured to generate impact vibrations caused by a collision of a stopper and a protrusion pursuant to the impact driving signal and generate rotational inertia vibrations by forcing the protrusion to stop rotating before colliding with the stopper or by reversing the rotation of the protrusion pursuant to the inertia driving signal.

12. The method as set forth in claim 11, wherein the properties of the sound signal include frequency, magnitude, envelope, roughness, loudness, and sharpness.

13. The method as set forth in claim 11, wherein the impact driving signal is generated based on a low-frequency signal of the sound signal, and the inertia driving signal is generated based on a high-frequency signal of the sound signal.

* * * * *